(12) United States Patent
Mayo et al.

(10) Patent No.: US 12,079,161 B2
(45) Date of Patent: Sep. 3, 2024

(54) DATA INDEX FOR DEDUPLICATION STORAGE SYSTEM

(71) Applicant: HEWLETT PACKARD ENTERPRISE DEVELOPMENT LP, Houston, TX (US)

(72) Inventors: Richard Phillip Mayo, Bristol (GB); Peter Thomas Camble, Bristol (GB); David Malcolm Falkinder, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 68 days.

(21) Appl. No.: 17/583,617

(22) Filed: Jan. 25, 2022

(65) Prior Publication Data

US 2023/0259488 A1 Aug. 17, 2023

(51) Int. Cl.
*G06F 7/00* (2006.01)
*G06F 16/11* (2019.01)
*G06F 16/13* (2019.01)
*G06F 16/16* (2019.01)

(52) U.S. Cl.
CPC .......... *G06F 16/125* (2019.01); *G06F 16/137* (2019.01); *G06F 16/162* (2019.01)

(58) Field of Classification Search
CPC ..... G06F 16/125; G06F 16/137; G06F 16/162
See application file for complete search history.

(56) References Cited

U.S. PATENT DOCUMENTS

| 4,658,400 | A | 4/1987 | Brown et al. | |
| 8,396,839 | B1 * | 3/2013 | Huang | G06F 16/1748 711/161 |
| 8,706,666 | B2 | 4/2014 | Moss | |
| 8,706,971 | B1 * | 4/2014 | Nayak | G06F 12/0873 711/141 |
| 8,782,368 | B2 | 7/2014 | Lillibridge et al. | |
| 9,420,457 | B2 | 8/2016 | Gonsalves et al. | |
| 9,479,542 | B2 | 10/2016 | Janssens et al. | |
| 9,509,576 | B2 | 11/2016 | Forlivesi et al. | |
| 9,626,517 | B2 | 4/2017 | Obukhov | |
| 10,002,050 | B1 * | 6/2018 | Zhang | G06F 11/1448 |
| 10,216,754 | B1 * | 2/2019 | Douglis | G06F 16/1744 |
| 10,310,594 | B2 | 6/2019 | Gonsalves et al. | |
| 10,365,974 | B2 | 7/2019 | Todd et al. | |
| 10,452,301 | B1 * | 10/2019 | Farhan | G06F 3/0656 |
| 10,795,812 | B1 * | 10/2020 | Duggal | G06F 3/067 |
| 11,182,256 | B2 | 11/2021 | Mayo et al. | |

(Continued)

*Primary Examiner* — Mohammed R Uddin
(74) *Attorney, Agent, or Firm* — Trop, Pruner & Hu, P.C.

(57) ABSTRACT

Example implementations relate to metadata operations in a storage system. An example includes a machine-readable medium storing instructions that upon execution cause a processor to: receive a data stream to be stored in persistent storage of a deduplication storage system; store data units of the data stream in a container entity group object according to arrival time, where the data units of the container entity group object are referenced by a plurality of container indexes; generate a data index to list each container index that references at least one data unit included in the container entity group object; and in response to a determination that the total size of the container entity group object exceeds the threshold size, transfer the container entity group object from memory to the persistent storage.

20 Claims, 12 Drawing Sheets

(56) References Cited

U.S. PATENT DOCUMENTS

| | | | |
|---|---|---|---|
| 11,550,493 B2 | 1/2023 | Falkinder et al. | |
| 2003/0046029 A1 | 3/2003 | Wiener et al. | |
| 2010/0082672 A1* | 4/2010 | Kottomtharayil | G06F 11/1451 |
| | | | 711/E12.001 |
| 2010/0333116 A1* | 12/2010 | Prahlad | G06F 3/0649 |
| | | | 713/153 |
| 2013/0046944 A1* | 2/2013 | Domyo | G06F 11/1453 |
| | | | 711/E12.103 |
| 2013/0103918 A1* | 4/2013 | Dictos | G06F 3/0656 |
| | | | 711/171 |
| 2014/0188822 A1* | 7/2014 | Das | H03M 7/30 |
| | | | 707/693 |
| 2014/0244599 A1* | 8/2014 | Zhang | G06F 3/0641 |
| | | | 707/692 |
| 2017/0131934 A1* | 5/2017 | Kaczmarczyk | G06F 3/0673 |
| 2017/0279889 A1* | 9/2017 | Boss | G06F 3/067 |
| 2019/0114102 A1* | 4/2019 | Chen | G06F 3/0604 |
| 2020/0192871 A1* | 6/2020 | Hirsch | G06F 16/1748 |
| 2020/0319822 A1 | 10/2020 | Kuo et al. | |
| 2020/0320040 A1* | 10/2020 | Butt | G06F 16/13 |
| 2021/0092018 A1 | 3/2021 | Fang et al. | |
| 2022/0107921 A1* | 4/2022 | Mayo | G06F 16/1815 |
| 2022/0147264 A1 | 5/2022 | Falkinder et al. | |
| 2023/0033584 A1* | 2/2023 | Makam | G06F 12/0866 |
| 2023/0135316 A1* | 5/2023 | Wojcik | G06F 16/90335 |
| | | | 707/769 |
| 2023/0169855 A1* | 6/2023 | Wu | G08G 1/07 |
| | | | 340/907 |
| 2023/0171273 A1* | 6/2023 | Vaidya | H04L 63/105 |
| | | | 726/23 |

\* cited by examiner

DATA INDEX FOR DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

Figure 1:
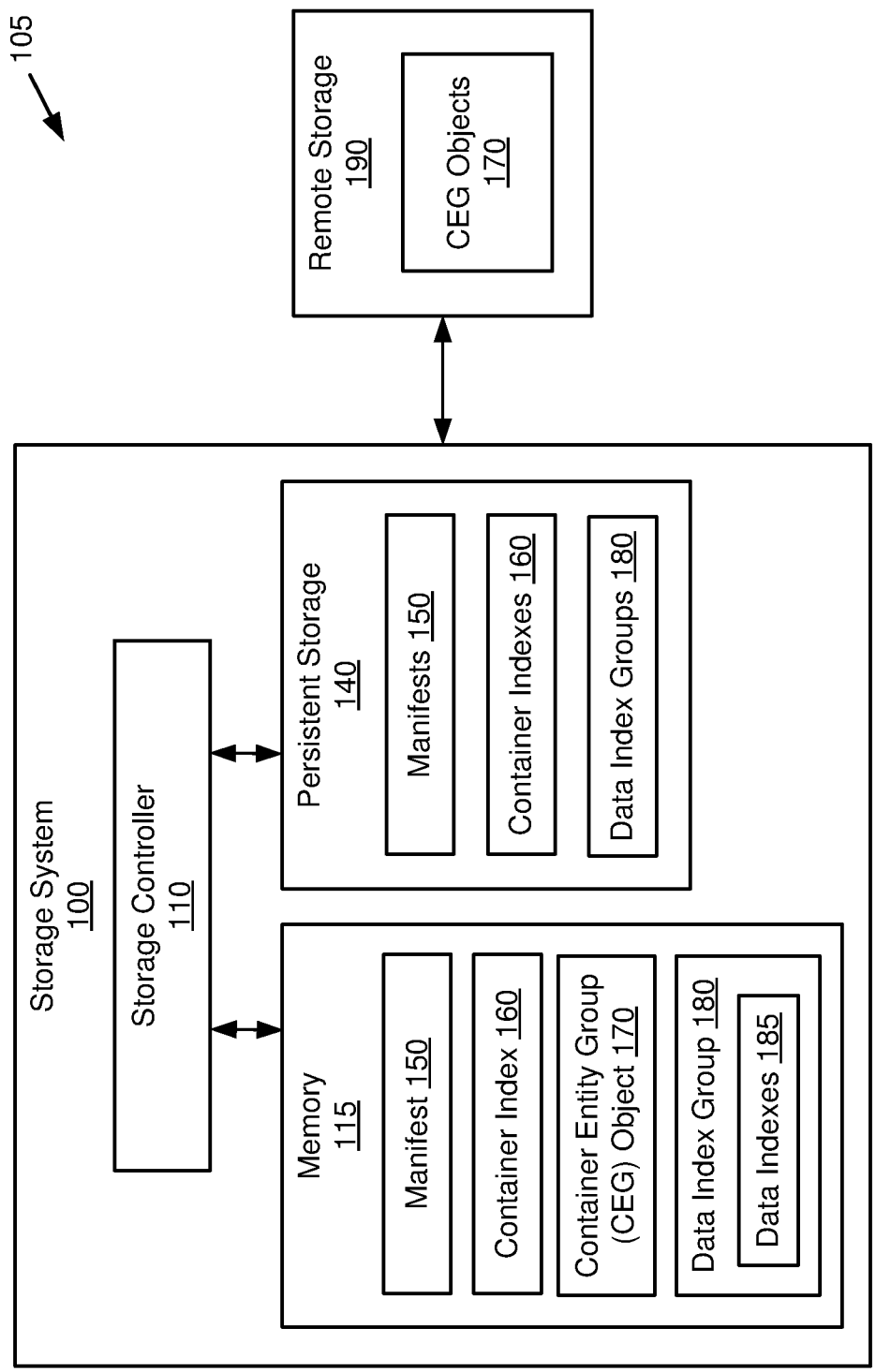
FIG. 1 is a schematic diagram of an example system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may deduplicate data to reduce the amount of space required to store the data. The storage system may perform a deduplication process including breaking a stream of data into discrete data units or "chunks." Further, the storage system may determine identifiers or "fingerprints" of incoming data units, and may determine which incoming data units are duplicates of previously stored data units. In the case of data units that are duplicates, the storage system may store references to the previous data units instead of storing the duplicate incoming data units.

As used herein, the term "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may store data units in container data objects included in a remote storage (e.g., a "cloud" or network storage service), rather than in a local filesystem. Further, when the source data stream is updated to include new data (e.g., during a backup process), it may be necessary to append the container data objects to include new data units (referred to as a "data update"). Such appending may involve performing a "get" operation to retrieve a container data object, loading and processing the container data object in memory, and then performing a "put" operation to transfer the updated container data object from memory to the remote storage. However, in many examples, the size of the data update (e.g., 1 MB) may be significantly smaller than the size of the container data object (e.g., 100 MB). Accordingly, the aforementioned process including transferring and processing the container data object may involve a significant amount of wasted bandwidth, processing time, and so forth. Therefore, in some examples, each data update may be stored as a separate object (referred to herein as a "container entity group") in the remote storage, instead of being appended to a larger container data object. However, in many examples, the data updates may correspond to many locations spread throughout the data stream. Accordingly, writing the container entity groups to the remote storage may involve a relatively large number of transfer operations, with each transfer operation involving a relatively small data update. However, in some examples, the use of a remote storage service may incur financial charges that are based on the number of individual transfers. Therefore, storing data updates individually in a remote storage service may result in significant costs.

In accordance with some implementations of the present disclosure, a deduplication storage system may store data updates in a memory buffer according to arrival order. The data updates may correspond to different container indexes. Each container index includes metadata indicating the locations in which multiple data unit are stored. When the stored data updates in memory reach a threshold size, the storage system may transfer the stored data updates to the remote storage as a single container entity group ("CEG") object of a desired size. Accordingly, the number and size of transfers to remote storage may be controlled by adjusting the threshold size. In this manner, the financial cost associated with the transfers to remote storage may be reduced or optimized.

Further, in some implementations, the storage system may generate, for each CEG object, a stored data structure (referred to herein as a "data index") to identify the container indexes that reference the data units in the CEG object. The data index may be relatively small in comparison to the CEG object and a container index. In some implementations, multiple data indexes may be stored together in a data index group. By combining multiple data indexes into one data index group object, the number of transfers to and from memory required to use the data indexes may be reduced.

In some implementations, a housekeeping process may include determining that a container index no longer references a data unit in the CEG object. In response to this determination, the identifier of that container index may be removed from the data index associated with the CEG object. Further, if the data index is empty after removing the container index identifier, it may be determined that the associated CEG object is no longer referenced by any container index. In contrast, without use of the data index, determining whether the CEG object is still referenced by any container index may require loading each container index in turn, and evaluating the reference counts included therein. In some implementations, upon determining that the data index is empty, the data index and the CEG object may be deleted. In this manner, the data index may allow housekeeping of stale data without requiring the loading of multiple container indexes into memory. Accordingly, some implementations may improve the performance of the deduplication storage system.

FIG. 1—Example System

FIG. 1 shows an example system 105 that includes a storage system 100 and a remote storage 190. The storage system 100 may include a storage controller 110, memory 115, and persistent storage 140, in accordance with some implementations. The storage system 100 may be coupled to the remote storage 190 via a network connection. The remote storage 190 may be a network-based storage facility or service (also referred to herein as "cloud-based storage"). In some examples, use of the remote storage 190 may incur financial charges that are based on the number of individual transfers.

The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium). In some implementations, the memory 115 may include manifests 150, container indexes 160, container entity group (CEG) objects 170, and data index groups 180. Further, the persistent storage 140 may store manifests 150, container indexes 160, and data index groups 180.

In some implementations, the storage system 100 may perform deduplication of stored data. For example, the storage controller 110 may divide a stream of input data into data units, and may include at least one copy of each data unit in a CEG object 170 (e.g., by appending the data units to the end of the CEG object 170). Further, the storage controller 110 may generate a manifest 150 to record the order in which the data units were received. The manifest 150 may include a pointer or other information indicating the container index 160 that is associated with each data unit. As used herein, a "container index" is a data structure containing metadata for a plurality of data units. For example, the metadata in the container index 160 may including a hash of a data unit for use in a matching process of a deduplication process. Further, the metadata in the container index 160 may include a reference count of a data unit (e.g., indicating the number of manifests 150 that reference each data unit) for use in housekeeping (e.g., to determine whether to delete a stored data unit). Furthermore, the metadata in the container index 160 may include identifiers for the storage locations of data units (e.g., particular locations in multiple CEG objects 170) for use in reconstruction of deduplicated data. In some implementations, a container index 160 may be a separate data structure from the data structures in which the associated data units are stored (i.e., separate from each of multiple CEG objects 170 that store the data units referenced by the container index 160).

In one or more implementations, the storage controller 110 may generate a fingerprint for each data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints of the stored data units. If this comparison results in a match, then the storage controller 110 may determine that a duplicate of the incoming data unit is already stored by the storage system 100.

In some implementations, the storage controller 110 may receive a read request to access the stored data, and in response may access the manifest 150 to determine the sequence of data units that made up the original data. The storage controller 110 may then use pointer data included in the manifest 150 to identify the container indexes 160 associated with the data units. Further, the storage controller 110 may use information included in the identified indexes 160 to determine the locations that store the data units (e.g., CEG objects 170, offsets, etc.), and may then read the data units from the determined locations.

In some implementations, each CEG object 170 may be formed by buffering received data units in memory 115 according to arrival order. The buffered data units may correspond to different container indexes 160. When the buffered data units in memory 115 reach a first threshold size, the storage controller 110 may transfer the buffered data units to the remote storage 190 as a single CEG object 170 of a desired size. In some implementations, the first threshold size may be configuration setting of the storage system 100. Accordingly, the storage controller 110 may reduce or control the number of data transfers to the remote storage 190, and may reducing the financial cost associated with the transfers to the remote storage 190.

In some implementations, the storage controller 110 may generate a data index 185 for each CEG object 170. The data index 185 may identify the container indexes 160 that reference the data units in the associated CEG object 170. Further, the storage controller 110 may group multiple data indexes 185 into a data index group 180. In some implementations, the storage controller 110 may perform a housekeeping process to delete stale data that is no longer needed for the storage system 100. During this housekeeping process, the storage controller 110 may determine that a container index 160 no longer references a data unit in a CEG object 170. The storage controller 110 may then delete the identifier of the container index 160 from the data index 185 associated with the CEG object 170. Further, the storage controller 110 may determine that the data index 185 is empty after removing the container index identifier, and in response may delete the data index 185 and the CEG object 170. In this manner, the data index 185 may allow housekeeping of stale data in the storage system 100. The disclosed techniques using CEG object 170 and data indexes 185 are discussed further below with reference to FIGS. 2-9.

Figure 2:
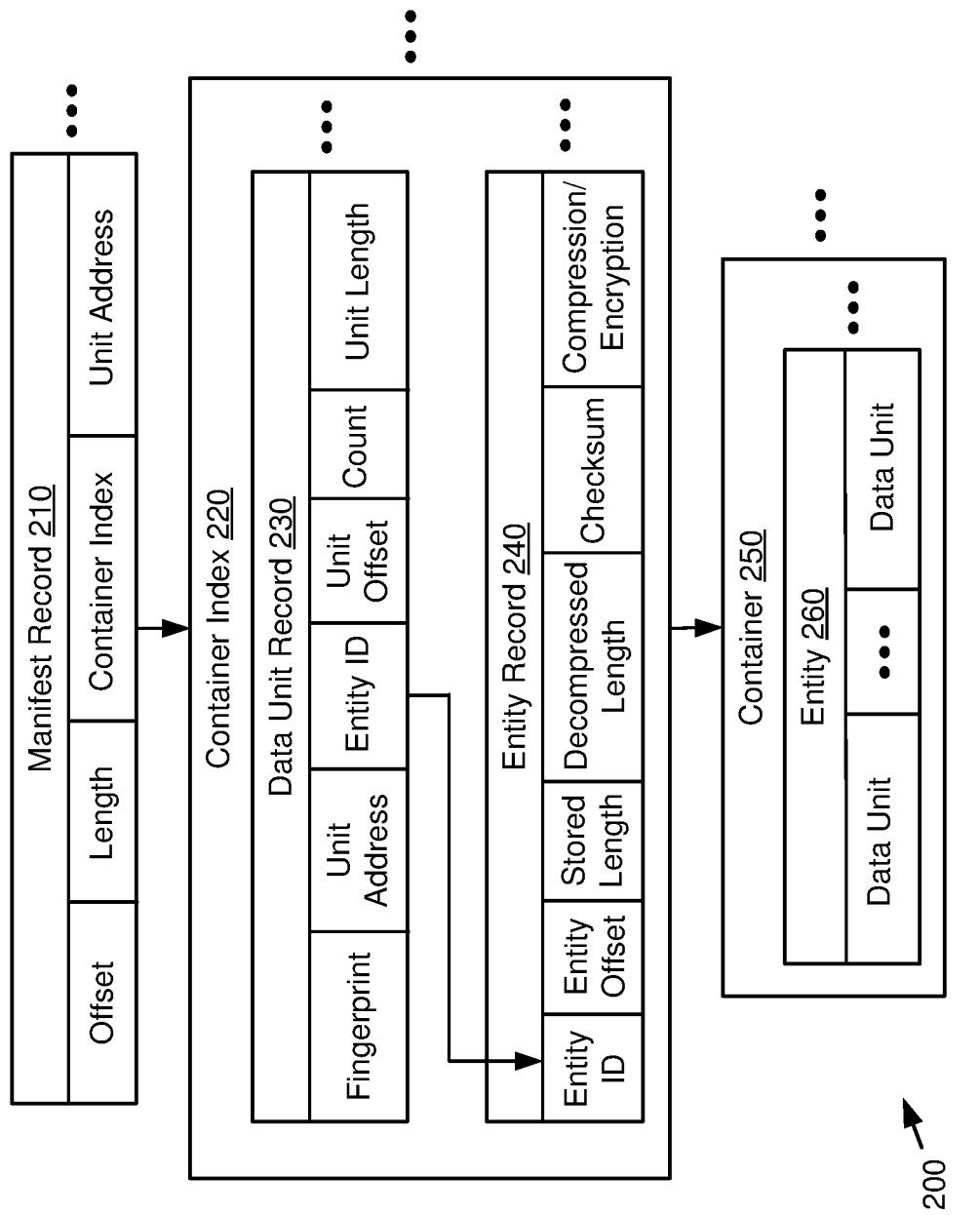
FIG. 2 is an illustration of example data structures, in accordance with some implementations.

FIG. 2—Example Data Structures

Referring now to FIG. 2, shown is an illustration of example data structures 200 used in deduplication, in accordance with some implementations. As shown, the data structures 200 may include a manifest record 210, a container index 220, and a container 250. In some examples, the manifest record 210, the container index 220, and the container 250 may correspond generally to example implementations of a manifest 150, a container index 160, and a data container 170 (shown in FIG. 1), respectively. In some examples, the data structures 200 may be generated and/or managed by the storage controller 110 (shown in FIG. 1).

As shown in FIG. 2, in some examples, the manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, and a unit length. In some examples, the reference count value may indicate the number of manifest records 210 that reference the data unit record 230. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

FIGS. 3 and 4A-4D—Example Process for Adding Data Units

Figure 3:
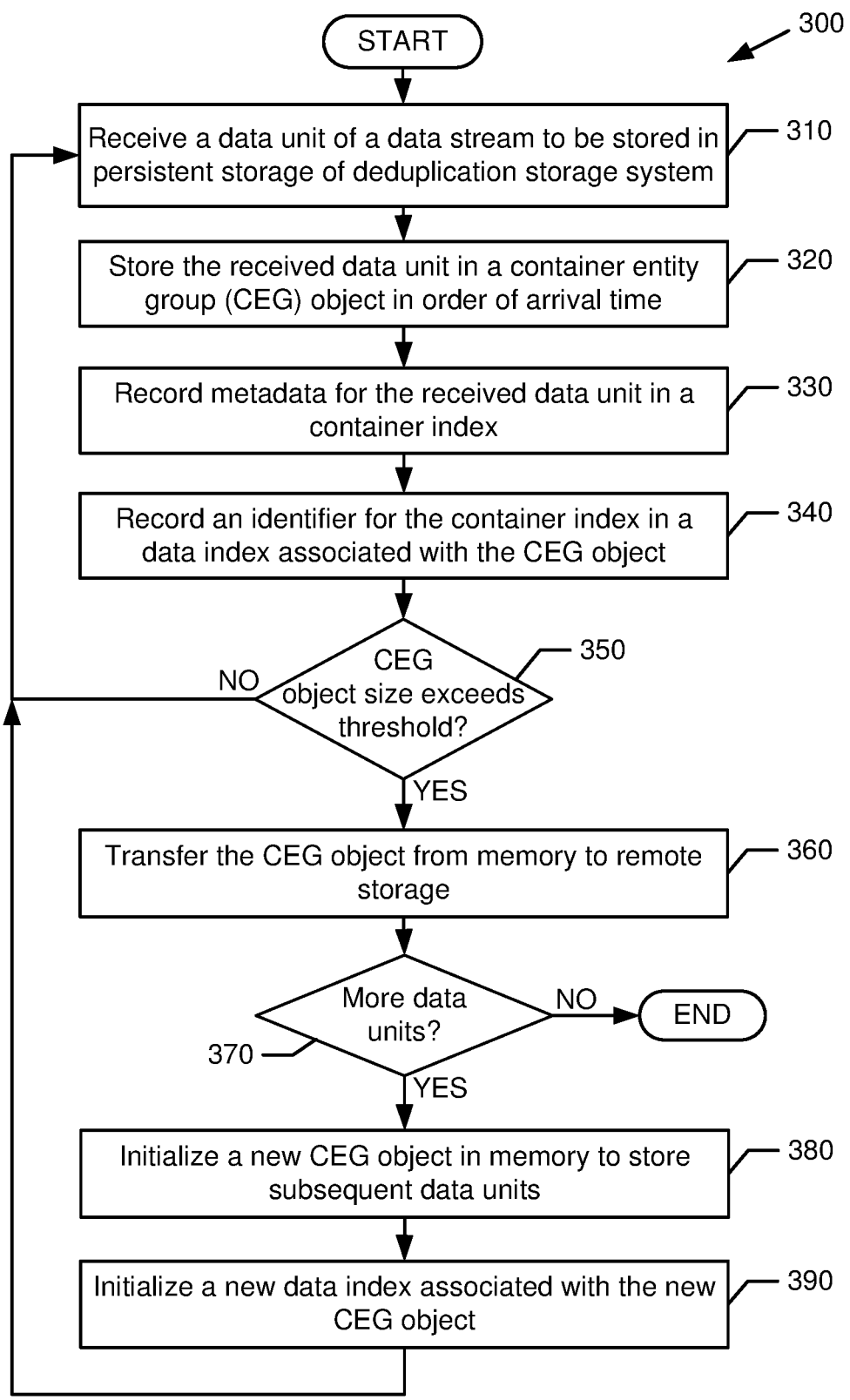
FIG. 3 is an illustration of an example process, in accordance with some implementations.

Referring now to FIG. 3, shown is an example process 300 for adding data units, in accordance with some implementations. The process 300 may be performed by the storage controller 110 executing instructions. The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 300 are described below with reference to FIGS. 4A-4D, which show example operations in accordance with some implementations. However, other implementations are also possible.

Figure 4A:
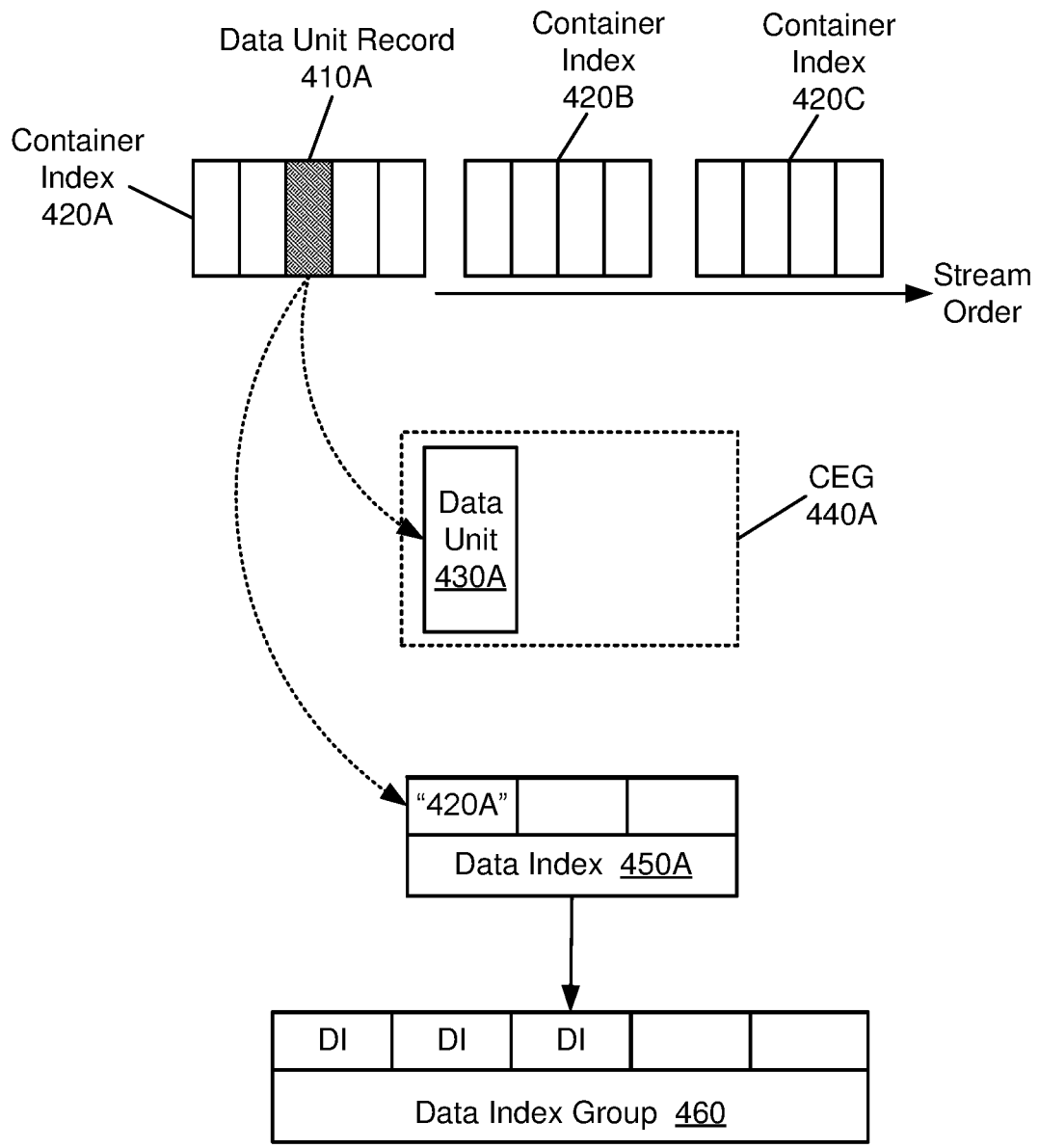
FIGS. 4A-4D are illustrations of example operations, in accordance with some implementations.
Figure 4B:
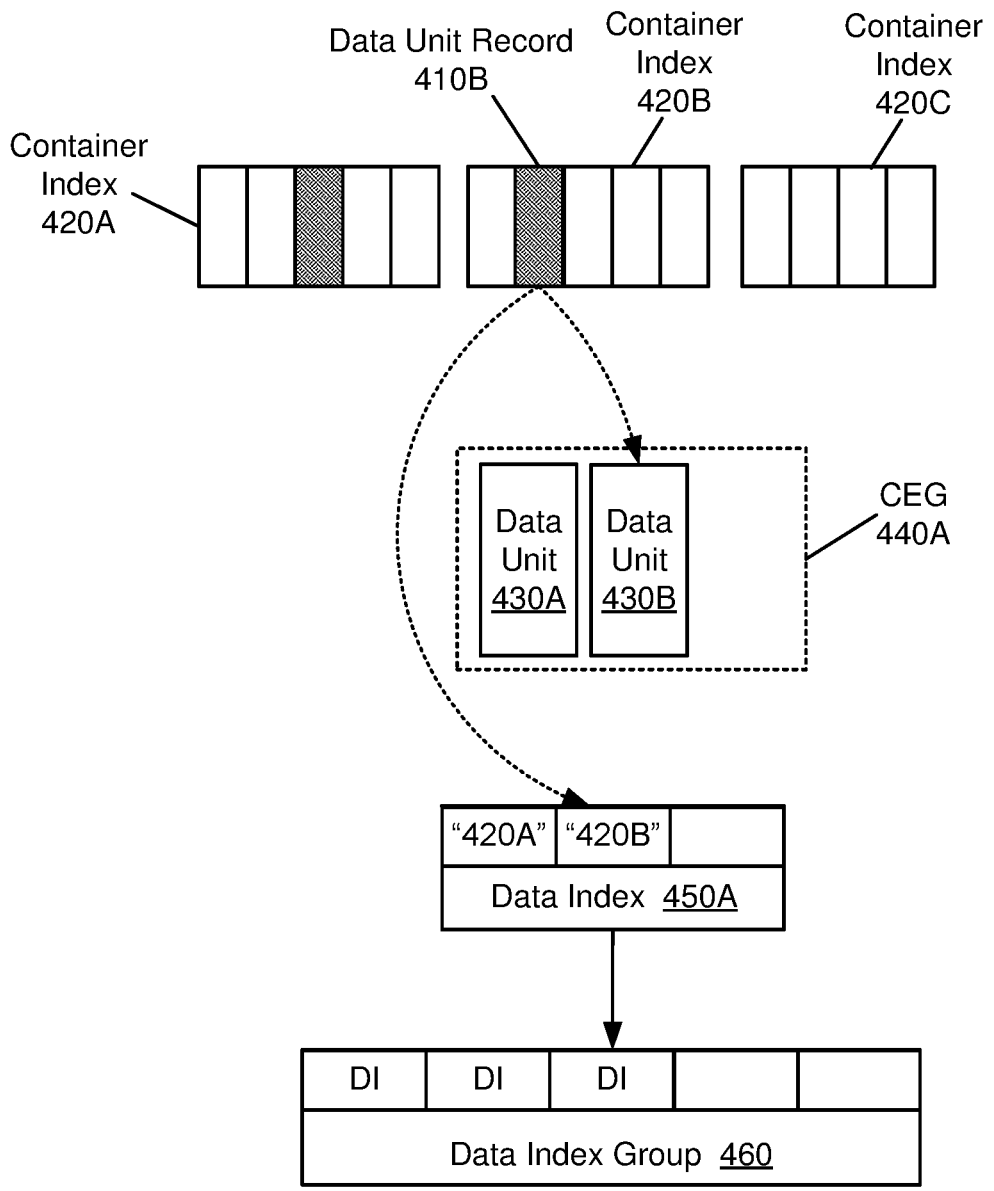
Figure 4C:
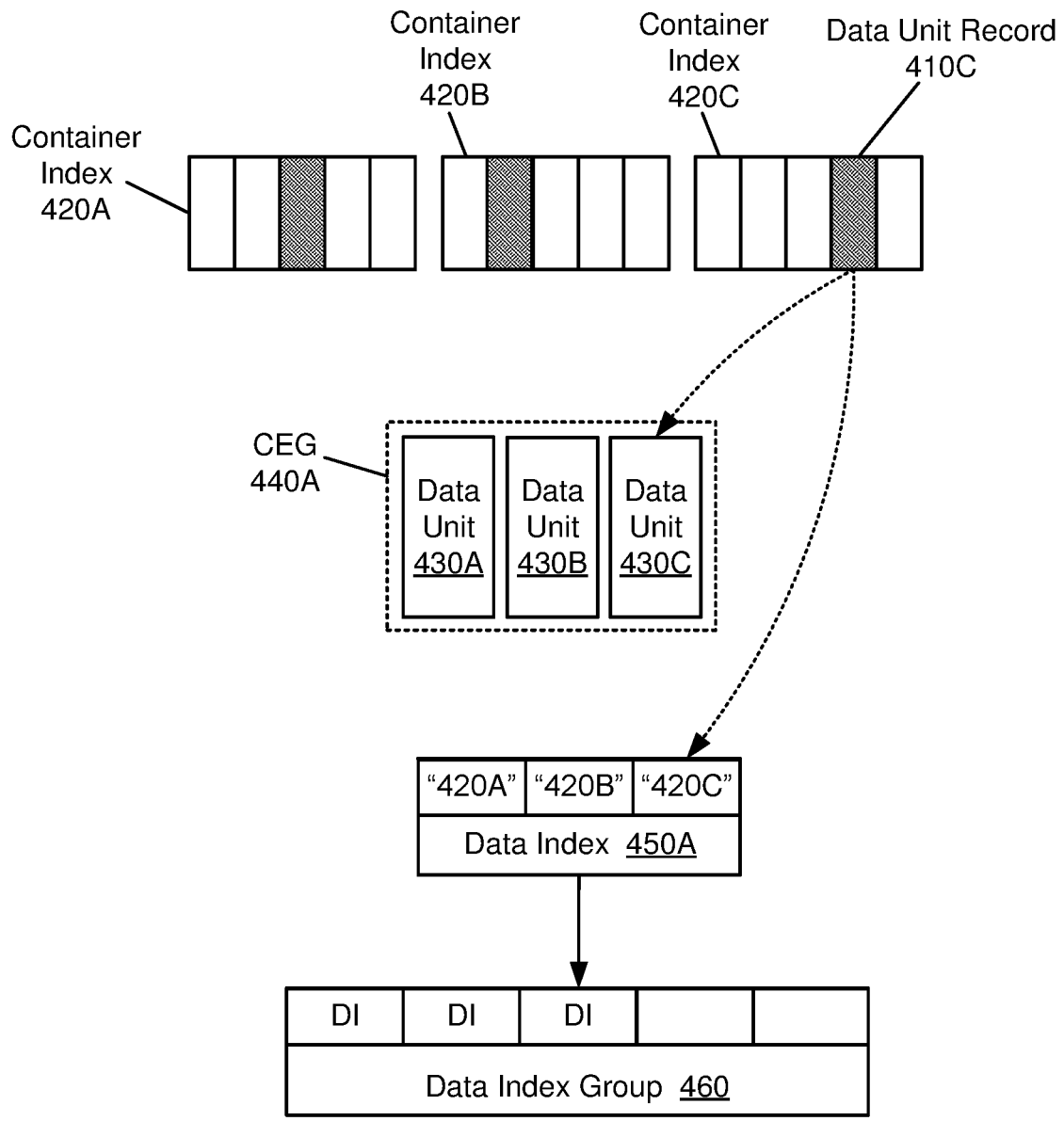
Figure 4D:
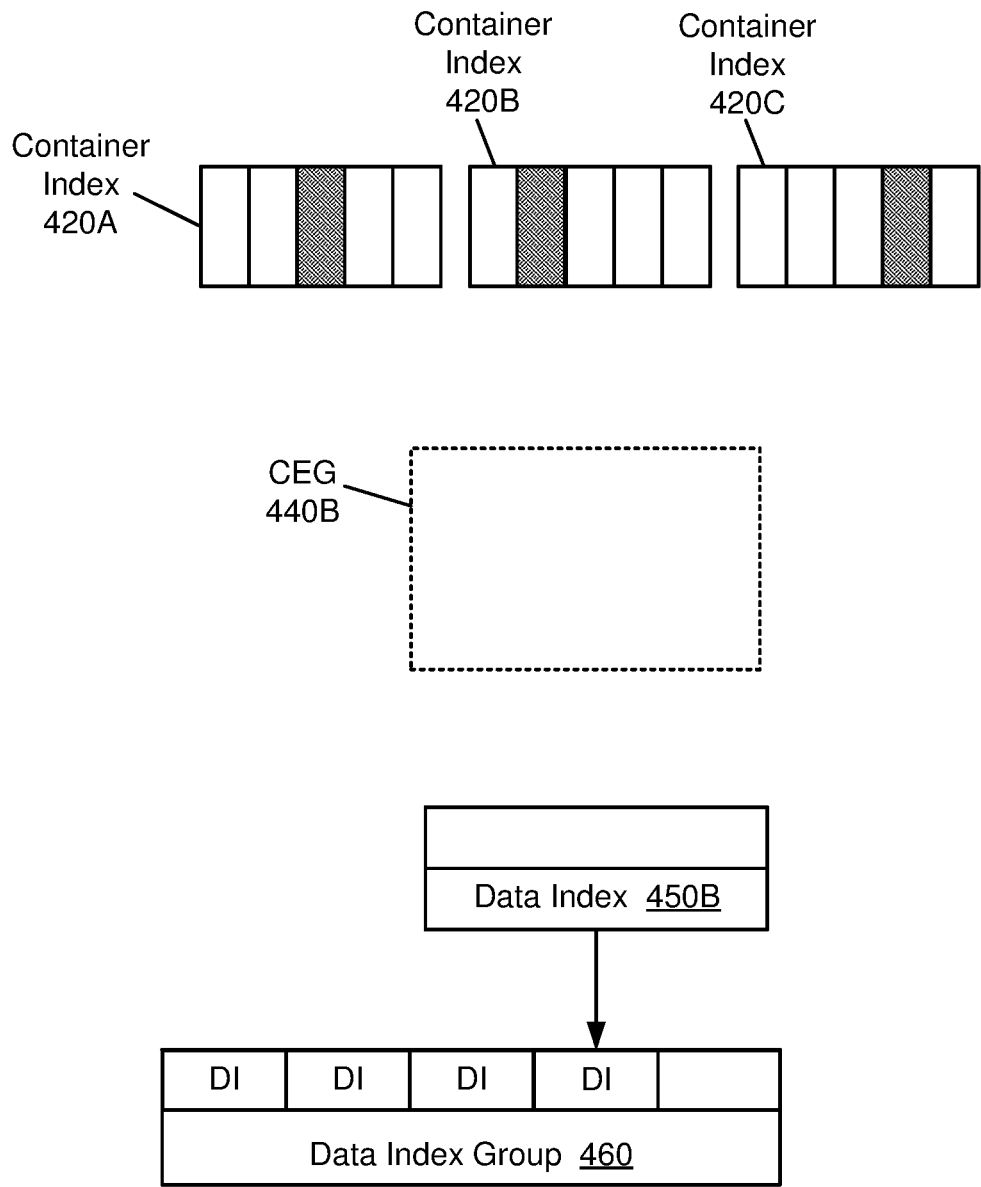

Block 310 may include receiving a data unit of a data stream to be stored in persistent storage of deduplication storage system. Block 320 may include storing the received data unit in a container entity group (CEG) object in order of arrival time. For example, referring to FIG. 4A, assume that a stored data stream is represented by a series of container indexes 420A, 420B, 420C (also referred to as "container indexes 420") that each include multiple data unit records. Each data unit record may include metadata for a stored data unit, including location information, reference counts, and so forth. The order of the data unit records corresponds to the order of the data units in the original data stream. Assume that, in the illustrated example, a storage controller (e.g., storage controller 110 shown in FIG. 1) receives a new data unit 430A to be added to a stored data stream. As shown in FIG. 4A, the storage controller puts the new data unit 430A into a container entity group (CEG) object 440A in memory (e.g., memory 115 shown in FIG. 1).

Referring again to FIG. 3, block 330 may include recording metadata for the received data unit in a container index. For example, referring to FIG. 4A, the storage controller may insert a new data unit record 410A into the container index 420A. The new data unit record 410A may include metadata for the new data unit 430A, such as location information, reference counts, and so forth. In some implementations, the location information in the container index 420A may include an identifier or key for the CEG object 440A. Further the location information may include one or more fields that can be used to determine the location of the data unit 430A within the CEG object 440A.

Referring again to FIG. 3, block 340 may include recording an identifier for the container index in a data index associated with the CEG object. For example, referring to FIG. 4A, the storage controller may insert the container index identifier "420A" (i.e., a unique identifier for container index 420A) into a data index 450A. In some implementations, the data index 450A is a stored data structure that includes an identifier of each container index that references the CEG object 440A (i.e., that includes a data unit record for a data unit included in the CEG object 440A). Further, as shown in FIG. 4A, the data index 450A may be one or multiple data indexes that are included in the data index group 460. In some implementations, the data index 450A may be identified using an identifier of the CEG object 440A that is included in the container index 420A. Further, in some implementations, the identifier of the CEG object 440A may be extended in the container index 420A to also identify the data index group 460.

Referring again to FIG. 3, decision block 350 may include determining whether the size of the CEG object exceeds a threshold level. If it is determined that the size of the CEG object does not exceed the threshold level ("NO"), the process 300 may return to block 310, and then blocks 320, 330, and 340 (i.e., to receive and store another data unit, record metadata, and update the data index). For example, referring to FIG. 4B, the storage controller may determine that the CEG object 440A has not reached a first threshold size, and therefore may continue adding data units to the CEG object 440A. Accordingly, the storage controller may receive a new data unit 430B, adds the data unit 430A to the CEG object 440A, insert a new data unit record 410B into the container index 420B, and insert the container index identifier "420B" into the data index 450A. Further, referring to FIG. 4C, the storage controller may receive a new data unit 430C, adds the data unit 430C to the CEG object 440A, insert a new data unit record 410C into the container index 420C, and insert the container index identifier "420C" into the data index 450A. In some implementations, the first threshold size may be configuration setting of the storage system 100.

Referring again to FIG. 3, if it is determined at decision block 350 that the size of the CEG object exceeds the threshold level ("YES"), the process 300 may continue at block 360, including transferring the CEG object from memory to remote storage. Decision block 370 may include determining whether there are more data units to be processed. If not ("NO"), the process 300 may be completed. Otherwise, if there are more data units to be processed ("YES"), the process 300 may continue at block 380 including initializing a new CEG object in memory to store subsequent data units. Block 390 may include initializing a new data index associated with the new CEG object. After block 390, the process 300 may return to block 310. For example, referring to FIGS. 4C-4D, the storage controller may determine that the CEG object 440A has reached the first threshold size (e.g., is at full capacity), and in response may perform a put operation to transfer the CEG object 440A to a remote storage (e.g., remote storage 190 shown in FIG. 1). The storage controller may initialize a CEG object 440B to store additional data units. Further, the storage controller may initialize a new data index 450B to store identifiers for each container index 420 that references the CEG object 440B. As shown, the new data index 450B may be included in the data index group 460 (i.e., along with the data index 450A sown in FIGS. 4A-4C).

Note that, while FIG. 4A illustrates an example operation in which the new data unit 430A as added to the CEG object 440A, implementations are not limited in this regard. For example, it is contemplated that the received data units are stored in a memory buffer of a specified size, and that the CEG object 440A itself is not formed until the memory buffer is full. Other variations are also possible.

Figure 5:
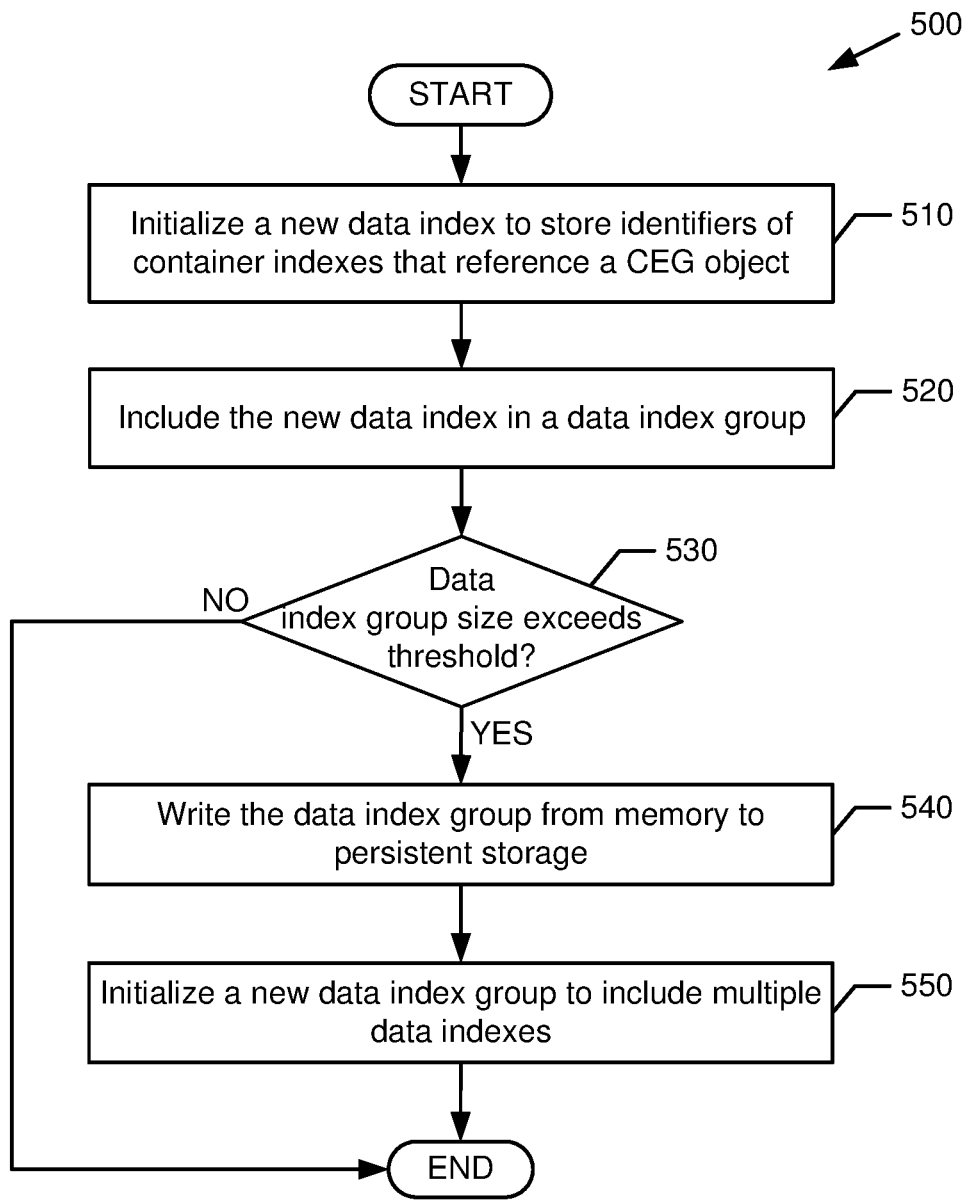
FIG. 5 is an illustration of an example process, in accordance with some implementations.

FIGS. 5—Example Process for Adding a New Data Index

Referring now to FIG. 5, shown is an example process 500 for adding a new data index, in accordance with some implementations. The process 500 may be performed by the storage controller 110 executing instructions. The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 500 are described below with reference to FIGS. 1 and 4A-4D, which show examples in accordance with some implementations. However, other implementations are also possible.

Block 510 may include initializing a new data index to store identifiers of container indexes that reference a CEG object. Block 520 may include including the new data index to a data index group. For example, referring to FIGS. 1 and 4C-4D, the storage controller 110 may initialize a new data index 450B to store identifiers for each container index 420 that references the CEG object 440B. Further, the storage controller 110 may add the new data index 450B to the data index group 460.

Referring again to FIG. 5, decision block 530 may include determining whether the data index group size exceeds a threshold level. If not ("NO"), the process 500 may be completed. Otherwise, if it is determined that the data index group size exceeds the threshold level, the process 500 may continue at block 540, including writing the data index group from memory to persistent storage. Block 550 may include initializing a new data index group to include multiple data indexes. After block 550, the process 500 may be completed. For example, referring to FIGS. 1 and 4D, assume that the data index group 460 has reached a second threshold size (e.g., a maximum size or full capacity). In response, the storage controller 110 may write the data index group 460 from the memory 115 to the persistent storage 140. The storage controller 110 may then initialize a new data index group 460 to store any additional data indexes that are generated (i.e., to store identifiers for each container index 420 that references additional CEG objects). In some implementations, the second threshold size may be configuration setting of the storage system 100.

Figure 6:
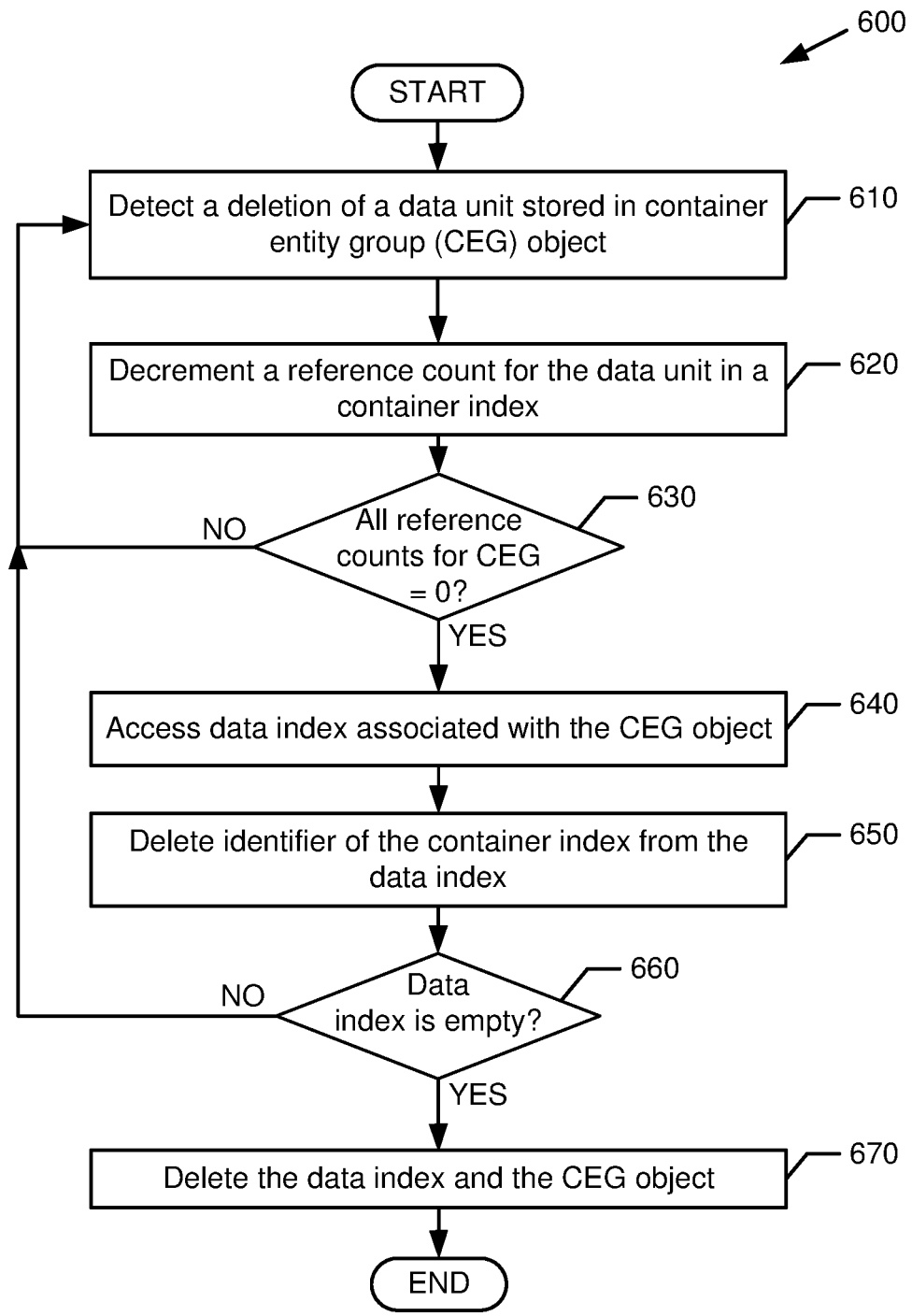
FIG. 6 is an illustration of an example process, in accordance with some implementations.

FIGS. 6—Example Process for Data Housekeeping

Referring now to FIG. 6, shown is an example process 600 for data housekeeping, in accordance with some implementations. In some implementations, the process 600 may be performed to delete container entity group objects that are no longer referenced by container indexes of a deduplication storage system. Further, the process 600 may be performed to delete data indexes associated with the deleted container entity group objects. The process 600 may be performed by the storage controller 110 executing instructions. The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 600 are described below with reference to FIGS. 1 and 4A, which show examples in accordance with some implementations. However, other implementations are also possible.

Block 610 may include detecting a deletion of a data unit stored in container entity group (CEG) object. Block 620 may include decrementing a reference count for the CEG object in a container index. For example, referring to FIGS. 1 and 4A, assume that the storage controller 110 detects that a manifest record no longer references the data unit 430A included in CEG object 440A. In response, the storage controller 110 may load the container index 420A into memory, and may decrement the reference count (included in container index 420A) for the data unit 430A by one.

Referring again to FIG. 6, decision block 630 may include determining whether all reference count for data units in the CEG object are equal to zero. If not ("NO"), the process 600 may return to block 610 (i.e., to detect the deletion of another data unit). Otherwise, if it is determined that the reference count for the data unit is equal to zero ("YES"), the process 600 may continue at block 640, including accessing the data index associated with the CEG object. Block 650 may include deleting the identifier of the container index from the data index. For example, referring to FIGS. 1 and 4A, the storage controller 110 may access the set of reference counts included in the container index 420A that correspond to data units in the CEG object 440A, and may determine whether each of the set of reference counts is equal to zero. In response, the storage controller 110 may access the data index 450A associated with the CEG object 440A (e.g., by loading the data index group 460 from persistent storage 140 to memory 115, if not already loaded in memory 115). The storage controller 110 may then delete the identifier "420A" for the container index 420A from the data index 450A (i.e., indicating that container index 420A no longer references the CEG object 440A).

Referring again to FIG. 6, decision block 660 may include determining whether the data index is empty. If not ("NO"), the process 600 may return to block 610 (i.e., to detect the deletion of another data unit). Otherwise, if it is determined that the data index is empty ("YES"), the process 600 may continue at block 670, including deleting the data index and the CEG object. After block 670, the process 600 may be completed. For example, referring to FIGS. 1 and 4C, the storage controller 110 may determine that the data index 450A is empty (i.e., does not include any container index identifiers), thereby indicating that no container indexes still reference the CEG object 440A. In response, the storage controller 110 may delete the CEG object 440A and its associated data index 450A. In this manner, the storage controller 110 may perform housekeeping of the data and associated metadata of the system 105.

Note that, while FIG. 6 illustrates an example housekeeping process 600 that includes blocks 610 and 620 (i.e., detecting a deletion of a data unit stored in a CEG object, and decrementing a reference count for the CEG object in a container index), implementations are not limited in this regard. For example, it is contemplated that a housekeeping process may be initiated by a trigger event (e.g., a command, a periodic timer, a schedule, etc.), and may include evaluating a series of container indexes in turn. In such an example, the process 600 may begin by performing decision block 630 for each container index (i.e., determining whether the container index includes any reference counts that are equal to zero), and then continuing to blocks 640-670 as needed. Other variations are also possible.

Figure 7:
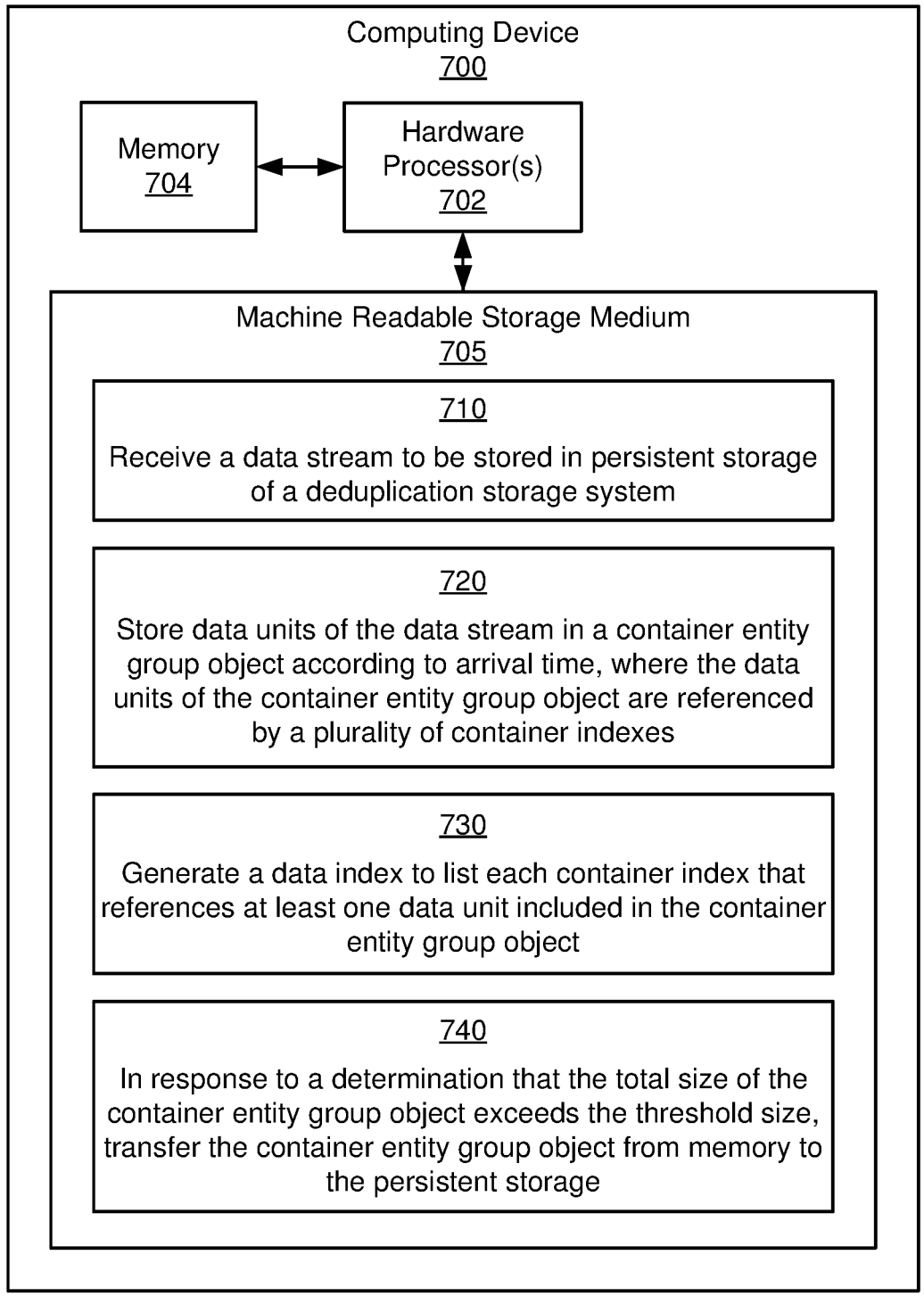
FIG. 7 is a schematic diagram of an example computing device, in accordance with some implementations.

FIG. 7—Example Computing Device

FIG. 7 shows a schematic diagram of an example computing device 700. In some examples, the computing device 700 may correspond generally to some or all of the storage system 100 (shown in FIG. 1). As shown, the computing device 700 may include a hardware processor 702, a memory 704, and machine-readable storage 705 including instructions 710-740. The machine-readable storage 705 may be a non-transitory medium. The instructions 710-740 may be executed by the hardware processor 702, or by a processing engine included in hardware processor 702.

Instruction 710 may be executed to receive a data stream to be stored in persistent storage of a deduplication storage system. Instruction 720 may be executed to store data units of the data stream in a container entity group object according to arrival time, where the data units of the container entity group object are referenced by a plurality of container indexes. For example, referring to FIGS. 1 and 4A, the storage controller 110 may receive a new data unit 430A, and may include the new data unit 430A in the CEG object 440A in memory 115. Further, the storage controller 110 may insert a new data unit record 410A into the container index 420A to reference the new data unit 430A.

Instruction 730 may be executed to generate a data index to list each container index that references at least one data unit included in the container entity group object. For example, referring to FIGS. 1 and 4A, the storage controller 110 may insert the container index identifier "420A" (i.e., a unique identifier for container index 420A) into the data index 450A. The data index 450A may be one of multiple data indexes included in a data index group 460.

Instruction 740 may be executed to, in response to a determination that the total size of the container entity group object exceeds the threshold size, transfer the container entity group object from memory to the persistent storage. For example, referring to FIGS. 1 and 4C-4D, the storage controller 110 may determine that the CEG object 440A has reached a threshold size (e.g., is at full capacity), and in response may perform a put operation to transfer the CEG object 440A from memory 115 to the remote storage 190. In some implementations, the storage controller 110 may initialize a new CEG object 440B to store additional data units, and may also initialize a new data index 450B to store identifiers for each container index 420 that references the new CEG object 440B.

Figure 8:
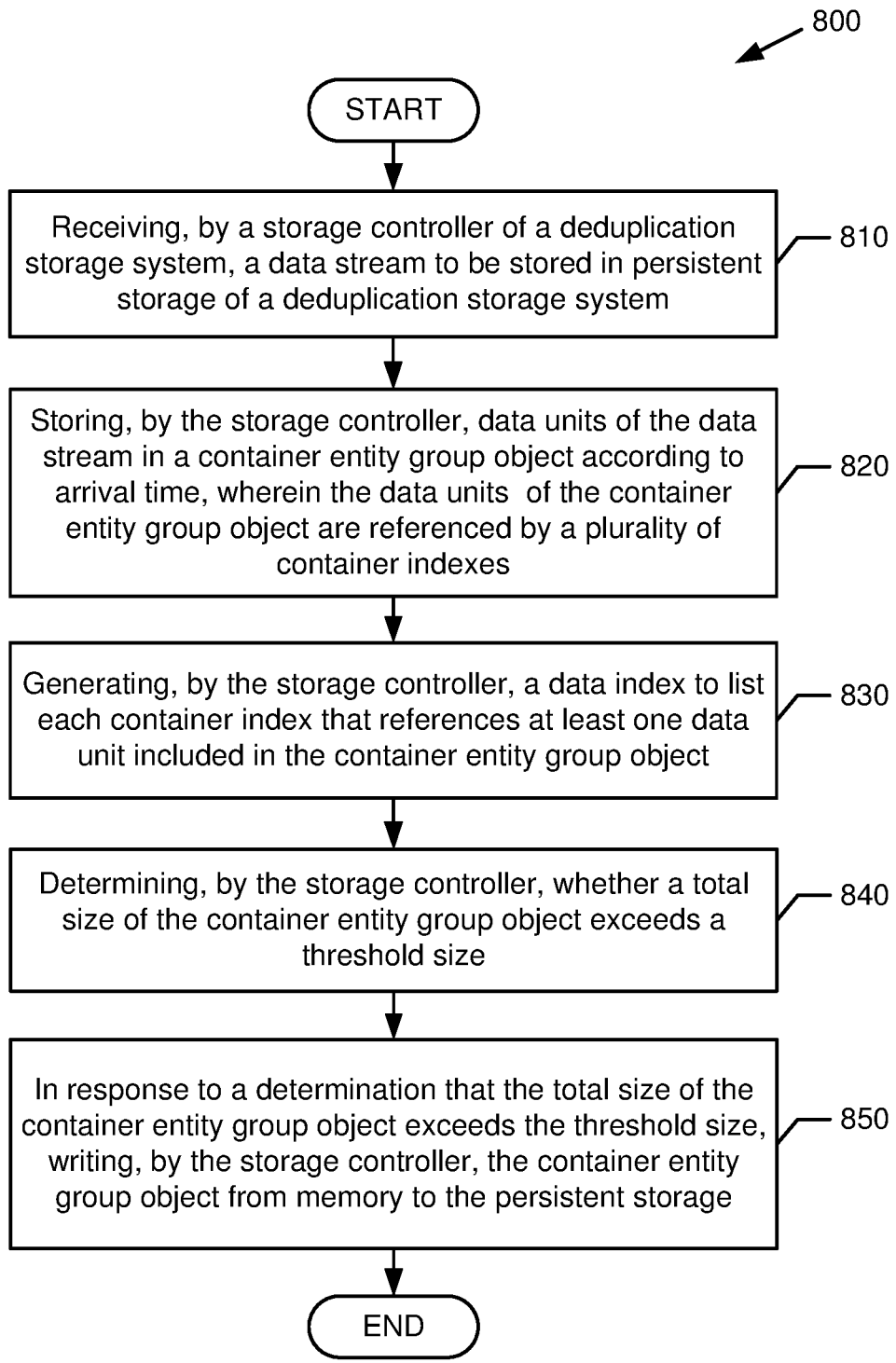
FIG. 8 is an illustration of an example process, in accordance with some implementations.

FIG. 8—Example Process

Referring now to FIG. 8, shown is an example process 800 in accordance with some implementations. In some examples, the process 800 may be performed using the storage controller 110 (shown in FIG. 1). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 810 may include receiving, by a storage controller of a deduplication storage system, a data stream to be stored in persistent storage of a deduplication storage system. Block 820 may include storing, by the storage controller, data units of the data stream in a container entity group object according to arrival time, where the data units of the container entity group object are referenced by a plurality of container indexes. Block 830 may include generating, by the storage controller, a data index to list each container index that references at least one data unit included in the container entity group object. Block 840 may include determining, by the storage controller, whether a total size of the container entity group object exceeds a threshold size. Block 850 may include, in response to a determination that the total size of the container entity group object exceeds the threshold size, writing, by the storage controller, the container entity group object from memory to the persistent storage. After block 850, the process 800 may be completed.

Figure 9:
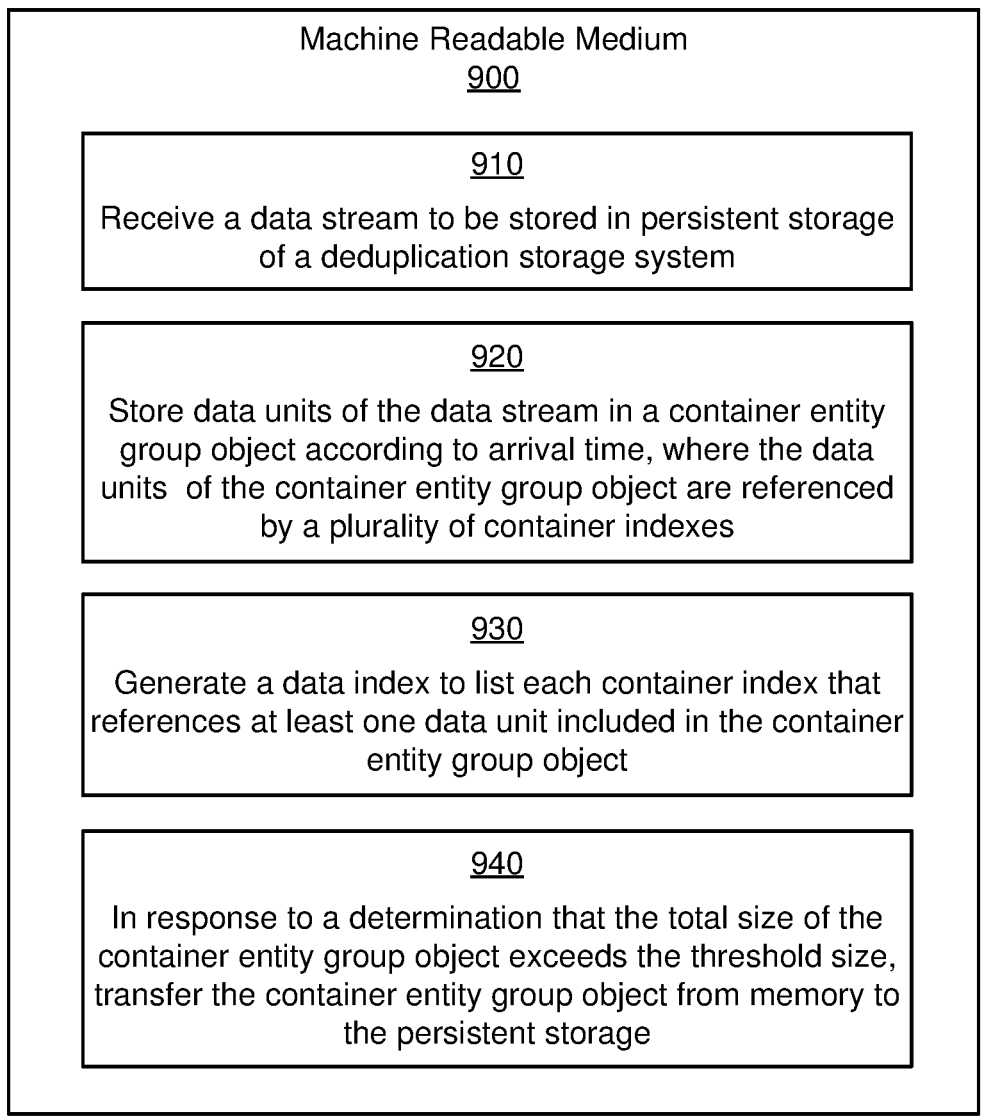
FIG. 9 is a diagram of an example machine-readable medium storing instructions in accordance with some implementations.

FIG. 9—Example Machine-Readable Medium

FIG. 9 shows a machine-readable medium 900 storing instructions 910-940, in accordance with some implementations. The instructions 910-940 can be executed by a single processor, multiple processors, a single processing engine, multiple processing engines, and so forth. The machine-readable medium 900 may be a non-transitory storage medium, such as an optical, semiconductor, or magnetic storage medium.

Instruction 910 may be executed to receive a data stream to be stored in persistent storage of a deduplication storage system. Instruction 920 may be executed to store data units of the data stream in a container entity group object according to arrival time, where the data units of the container entity group object are referenced by a plurality of container indexes. Instruction 930 may be executed to generate a data index to list each container index that references at least one data unit included in the container entity group object. Instruction 940 may be executed to, in response to a determination that the total size of the container entity group object exceeds the threshold size, transfer the container entity group object from memory to the persistent storage.

In accordance with implementations described herein, a deduplication storage system may store data updates in a memory buffer according to arrival order. When the stored data updates in memory reach a threshold size, the storage system may transfer the stored data updates to the remote storage as a single CEG object of a desired size. Accordingly, the number and size of transfers to remote storage may be controlled by adjusting the threshold size. In this manner, the financial cost associated with the transfers to remote storage may be reduced or optimized. Further, the storage system may generate a data index to identify the container indexes that reference the data units in the CEG object. In some implementations, a housekeeping process may include determining that a container index no longer references a data unit in the CEG object, and in response removing the identifier of the container index from the data index associated with the CEG object. If the data index is empty after removing the container index identifier, the data index and the CEG object may be deleted. In this manner, the data index may allow housekeeping of stale data without requiring the loading of multiple container indexes into memory. Accordingly, some implementations may improve the performance of the deduplication storage system.

Note that, while FIGS. 1-9 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A storage system comprising:
    a processor;
    a memory; and
    a machine-readable storage storing instructions, the instructions executable by the processor to:
        receive a data stream to be stored in persistent storage of a deduplication storage system;
        store data units of the data stream in a container entity group object according to arrival time, wherein the container entity group object is one of a plurality of container entity group objects;
        record, in a plurality of container indexes, metadata for the data units stored in the container entity group object;
        record, in a data index associated with the container entity group object, a list of the plurality of container indexes that record the metadata for the data units stored in the container entity group object, wherein the data index is one of a plurality of data indexes, wherein each data index of the plurality of data indexes is associated with a different container entity group object of the plurality of container entity group objects, and wherein each data index of the plurality of data indexes is to list only container indexes that reference data units stored in the container entity group object associated with that data index; and
        in response to a determination that the total size of the container entity group object exceeds a first threshold size, transfer the container entity group object from memory to the persistent storage.

2. The storage system of claim 1, including instructions executable by the processor to:
    in response to the determination that the total size of the container entity group object exceeds the first threshold size:
        initialize a new container entity group object in the memory; and
        initialize a new data index in the memory.

3. The storage system of claim 2, including instructions executable by the processor to:
    include the data index and the new data index in a data index group; and
    in response to a determination that the data index group exceeds a second threshold size:
        write the data index group from memory to the persistent storage; and
        initialize a new data index group in the memory.

4. The storage system of claim 3, wherein the first threshold size and the second threshold size are configuration settings of the storage system.

5. The storage system of claim 1, including instructions executable by the processor to:
  access a plurality of reference counts included in a first container index, wherein each of the plurality of reference counts corresponds to a different data unit stored in the container entity group object;
  determine whether each of the plurality of reference counts is equal to zero; and
  in response to a determination that each of the plurality of reference counts is equal to zero, delete an identifier of the first container index from the data index.

6. The storage system of claim 1, including instructions executable by the processor to:
  determine whether the data index is empty; and
  in response to a determination that the data index is empty, delete the data index and the container entity group object.

7. The storage system of claim 1, wherein the persistent storage is a network-based storage service, and wherein the storage system is coupled to the network-based storage service via a network connection.

8. A method comprising:
  receiving, by a storage controller of a deduplication storage system, a data stream to be stored in persistent storage of a deduplication storage system;
  storing, by the storage controller, data units of the data stream in a container entity group object according to arrival time, wherein the container entity group object is one of a plurality of container entity group objects;
  recording, by the storage controller, in a plurality of container indexes, metadata for the data units stored in the container entity group object;
  recording, by the storage controller, in a data index associated with the container entity group object, a list of the plurality of container indexes that record the metadata for the data units stored in the container entity group object, wherein the data index is one of a plurality of data indexes, wherein each data index of the plurality of data indexes is associated with a different container entity group object of the plurality of container entity group objects, and wherein each data index of the plurality of data indexes is to list only container indexes that reference data units stored in the container entity group object associated with that data index;
  determining, by the storage controller, whether a total size of the container entity group object exceeds a threshold size; and
  in response to a determination that the total size of the container entity group object exceeds the threshold size, writing, by the storage controller, the container entity group object from memory to the persistent storage.

9. The method of claim 8, further comprising:
  in response to the determination that the total size of the container entity group object exceeds the first threshold size:
    initializing a new container entity group object in the memory; and
    initializing a new data index in the memory.

10. The method of claim 9, further comprising:
  including the data index and the new data index in a data index group;
  determining whether the data index group exceeds a second threshold size; and
  in response to a determination that the data index group exceeds the second threshold size:
    writing the data index group from memory to the persistent storage; and
    initializing a new data index group in the memory.

11. The method of claim 10, wherein the first threshold size and the second threshold size are configuration settings of the storage system.

12. The method of claim 8, further comprising:
  accessing a plurality of reference counts included in a first container index, wherein each of the plurality of reference counts corresponds to a different data unit stored in the container entity group object;
  determining whether each of the plurality of reference counts is equal to zero; and
  in response to a determination that each of the plurality of reference counts is equal to zero, deleting an identifier of the first container index from the data index.

13. The method of claim 8, further comprising:
  determining whether the data index is empty; and
  in response to a determination that the data index is empty, deleting the data index and the container entity group object.

14. The method of claim 8, wherein the persistent storage is a network-based storage service, and wherein the storage system is coupled to the network-based storage service via a network connection.

15. A non-transitory machine-readable medium storing instructions that upon execution cause a processor to:
  receive a data stream to be stored in persistent storage of a deduplication storage system;
  store data units of the data stream in a container entity group object according to arrival time, wherein the container entity group object is one of a plurality of container entity group objects;
  record, in a plurality of container indexes, metadata for the data units stored in the container entity group object;
  record, in a data index associated with the container entity group object, a list of the plurality of container indexes that record the metadata for the data units stored in the container entity group object, wherein the data index is one of a plurality of data indexes, wherein each data index of the plurality of data indexes is associated with a different container entity group object of the plurality of container entity group objects, and wherein each data index of the plurality of data indexes is to list only container indexes that reference data units stored in the container entity group object associated with that data index; and
  in response to a determination that the total size of the container entity group object exceeds the threshold size, transfer the container entity group object from memory to the persistent storage.

16. The non-transitory machine-readable medium of claim 15, including instructions that upon execution cause the processor to:
  in response to the determination that the total size of the container entity group object exceeds the first threshold size:
    initialize a new container entity group object in the memory; and
    initialize a new data index in the memory.

17. The non-transitory machine-readable medium of claim 16, including instructions that upon execution cause the processor to:
  include the data index and the new data index in a data index group; and in response to a determination that the data index group exceeds a second threshold size:
  write the data index group from memory to the persistent storage; and
  initialize a new data index group in the memory.

18. The non-transitory machine-readable medium of claim 17, wherein the first threshold size and the second threshold size are configuration settings of the storage system.

19. The non-transitory machine-readable medium of claim 15,
  including instructions that upon execution cause the processor to:
  access a plurality of reference counts included in a first container index, wherein each of the plurality of reference counts corresponds to a different data unit stored in the container entity group object;
  determine whether each of the plurality of reference counts is equal to zero; and
  in response to a determination that each of the plurality of reference counts is equal to zero, delete an identifier of the first container index from the data index.

20. The non-transitory machine-readable medium of claim 15, including instructions that upon execution cause the processor to:
  determine whether the data index is empty; and
  in response to a determination that the data index is empty, delete the data index and the container entity group object.

\* \* \* \* \*